United States Patent [19]
Kurita et al.

[11] Patent Number: 6,055,313
[45] Date of Patent: Apr. 25, 2000

[54] IMAGE PROCESSING SYSTEM AND IMAGE PROCESSING APPARATUS

[75] Inventors: Mitsuru Kurita, Tokyo; Yasumichi Suzuki; Koichi Ishimoto, both of Yokohama, all of Japan

[73] Assignee: Canon Kabushiki Kaisha, Tokyo, Japan

[21] Appl. No.: 08/974,514

[22] Filed: Nov. 19, 1997

Related U.S. Application Data

[60] Continuation of application No. 08/827,095, Mar. 27, 1997, abandoned, which is a division of application No. 08/126,649, Sep. 27, 1993, Pat. No. 5,668,881.

[30] Foreign Application Priority Data

Sep. 28, 1992 [JP] Japan .................................. 4-258212

[51] Int. Cl.⁷ ....................................................... H04L 9/00
[52] U.S. Cl. .................. 380/10; 380/54; 399/80
[58] Field of Search .................. 380/3, 4, 5, 10, 380/54; 359/450; 399/80

[56] References Cited

U.S. PATENT DOCUMENTS

| | | |
|---|---|---|
| 4,989,244 | 1/1991 | Naruse et al. ........................... 380/20 |
| 5,077,795 | 12/1991 | Rourke et al. . |
| 5,121,432 | 6/1992 | Gilham et al. . |
| 5,144,664 | 9/1992 | Esserman et al. . |
| 5,168,371 | 12/1992 | Takayanagi et al. . |
| 5,278,903 | 1/1994 | Matsui et al. . |
| 5,303,370 | 4/1994 | Brosh et al. ............................ 380/51 |
| 5,311,336 | 5/1994 | Kurita et al. . |
| 5,502,575 | 3/1996 | Kai et al. . |
| 5,581,613 | 12/1996 | Nagashima et al. . |
| 5,825,879 | 10/1998 | Davis ....................................... 380/5 |

*Primary Examiner*—Gilberto Barron, Jr.
*Attorney, Agent, or Firm*—Fitzpatrick, Cella, Harper & Scinto

[57] ABSTRACT

A plurality of apparatuses can execute an encrypting process on an image signal are connected. The encrypting processes which are executed in those apparatuses are independently performed, so that the connection of an improper apparatus is made impossible and, in this state, a more advanced signal process can be performed, thereby giving no disadvantage to the user. For this purpose, there is disclosed an image processing apparatus comprising a first encrypting circuit for encrypting the image data and supplying to a first apparatus and a second encrypting circuit for encrypting image data and supplying to a second apparatus different from the first apparatus, wherein the first and second encrypting means execute independently the encryption.

30 Claims, 13 Drawing Sheets

FIG. 6
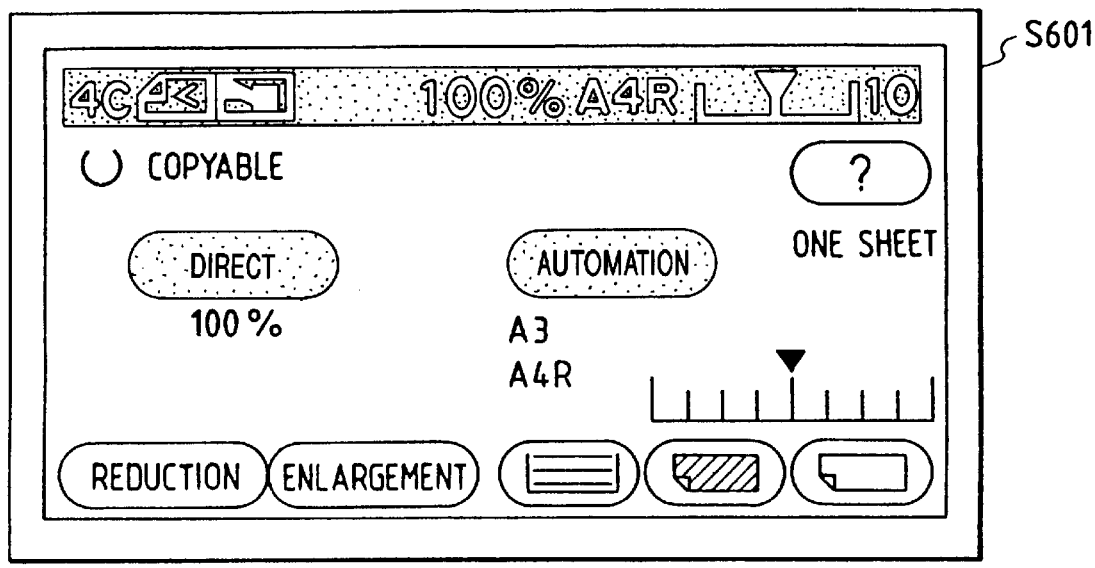
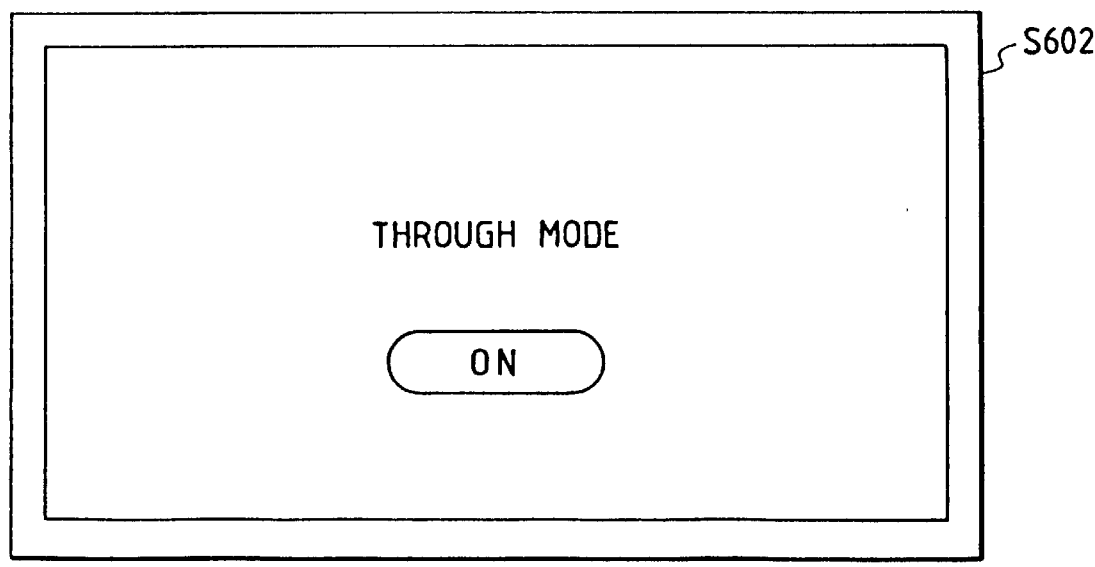

IMAGE PROCESSING SYSTEM AND IMAGE PROCESSING APPARATUS

This application is a continuation, of application Ser. No. 08/827,095, filed Mar. 27, 1997, now abandoned, which is a division of application Ser. No. 08/126,649, filed Sep. 27, 1993, now U.S. Pat. No. 5,668,881.

BACKGROUND OF THE INVENTION

1. Field of the Invention

The invention relates to an image processing apparatus for generating a coded image signal, and to an image processing system for transmitting and receiving coded image signals among a plurality of apparatuses.

2. Related Background Art

In recent years, in association with the improvement of the performance of a color copying apparatus, particularly, a color scanner, an apparatus has been developed having a structure such that a scanner and a printer are separate and a person can easily use the scanner and the printer separately.

In an image processing apparatus such that the scanner unit and the printer unit are separate and a person can individually use the scanner unit and the printer unit, there exists a possibility that an adverse influence, such as a decrease in signal level, may occur due to mismatching of the impedances of the scanner unit and the printer by use of an improper interface and an image memory or the like.

Further, when a system comprises a plurality of apparatuses, since image signals are transmitted among the plurality of apparatuses, there is a problem such that the signal level drops further.

SUMMARY OF THE INVENTION

It is an object of the invention to provide an image processing system and an image processing apparatus which can solve the above problems.

First, the invention is characterized by providing an image processing system and an image processing apparatus in which when a plurality of apparatuses are connected and image processes are executed among the plurality of apparatuses, it is difficult to connect an image apparatus having an improper interface, thereby eliminating any adverse influence occurring due to the connection of such an improper apparatus. As a result, no disadvantage results for the user.

According to a preferred embodiment of the invention to accomplish the above object, there is disclosed an image processing apparatus comprising: first encrypting means for encrypting image data and supplying the coded image data to a first apparatus; and second encrypting means for encrypting image data and supplying the coded image data to a second apparatus different from the first apparatus, wherein the first and second encrypting means independently perform the coding process.

Another object of the invention is to provide an image processing apparatus and an image processing system having a novel function.

The above and other objects and features of the present invention will become apparent from the following detailed description and the appended claims with reference to the accompanying drawings.

BRIEF DESCRIPTION OF THE DRAWINGS

FIG. 6 is a schematic view of a panel unit in the through mode;

FIG. 7 is a flowchart of a method of communicating between the image scanner unit and the printer unit when a copy button is on;

DETAILED DESCRIPTION OF THE PREFERRED EMBODIMENT

Figure 2:
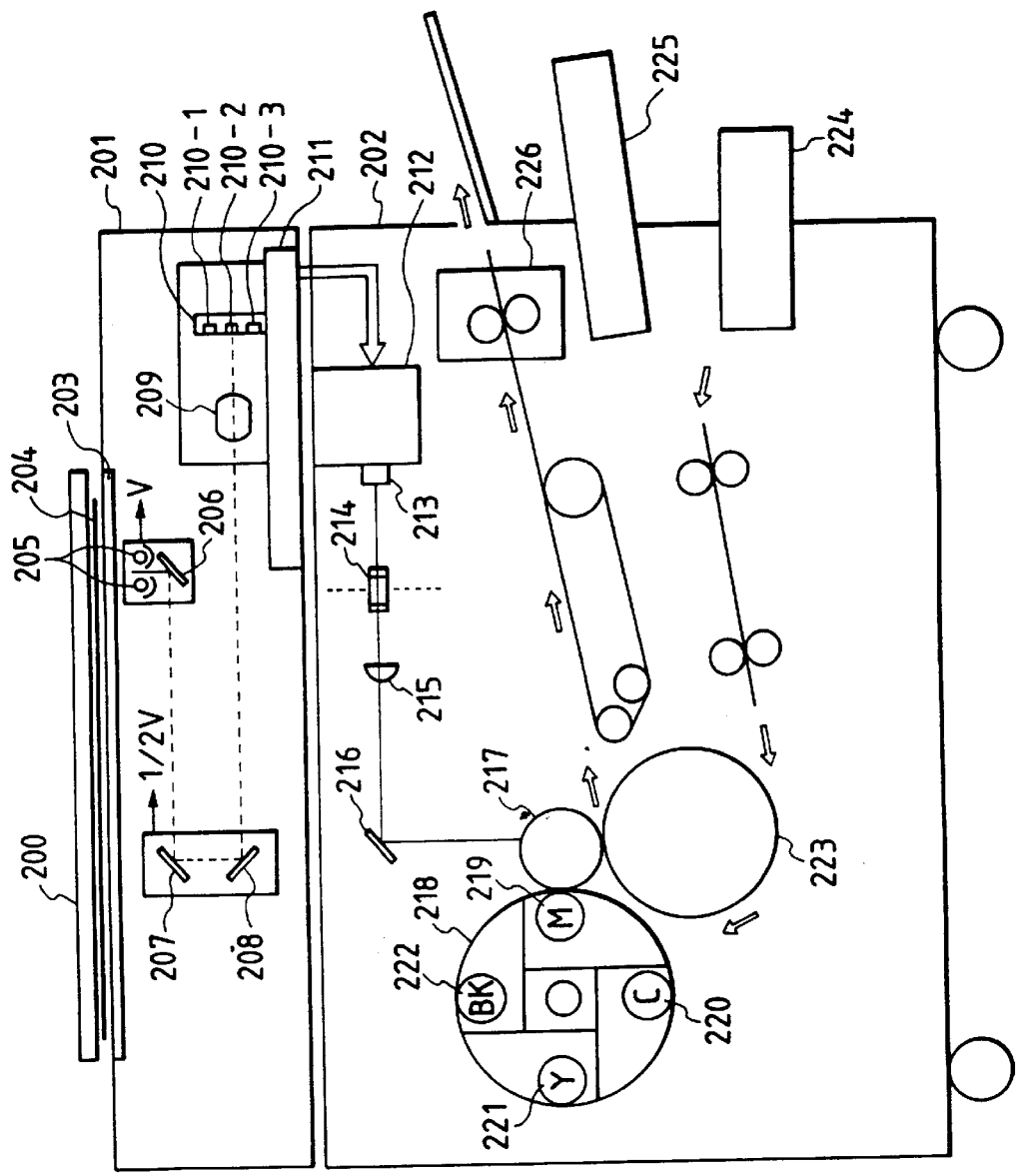
FIG. 2 is a cross sectional view of a color copying apparatus of an embodiment of the present invention.

FIG. 2 is a cross sectional view showing a construction of a color image processing apparatus of an embodiment of the invention.

In the diagram, reference numeral 201 denotes an image scanner unit for reading an original at a resolution of, for example, 400 dpi (dots per inch) and executing a digital signal process. The image scanner unit 201 comprises: a mirror surface pressing plate 200; an original glass plate 203; a lamp 205; mirrors 206 to 208; a lens 209; a 3-line sensor (hereinafter, referred to as a CCD) 210 (210-1, 210-2, 210-3); and a signal processing unit 211.

A printer unit 202 denotes a section to print a full color image onto a paper on the basis of an image signal from the image scanner unit 201. The printer unit 202 comprises: a printer reception signal processing unit 212; a semiconductor laser 213; a polygon mirror 214; an f-θ lens 215; a mirror 216; a photosensitive drum 217; a rotary developing device 218; developing units 219 to 222 of magenta, cyan, yellow, and black; a copy transfer drum 223; sheet cassettes 224 and 225; and a fixing unit 226.

The operation of the image scanner unit 201 will now be described. An original 204 on the original base plate 203 is illuminated by the lamp 205. The reflected light is reflected and guided by the mirrors 206 to 208. An image of the reflected light is formed on the CCD 210 through the lens 209 and is sent to the signal processing unit 211 as R (red), G (green), and B (blue) components (hereinafter, simply referred to as R, G and B components). The lamp 205 and mirror 206 electrically scan the line sensor at a speed v. The mirrors 207 and 208 electrically scan the line sensor at a speed of (½)v.

Figure 1:
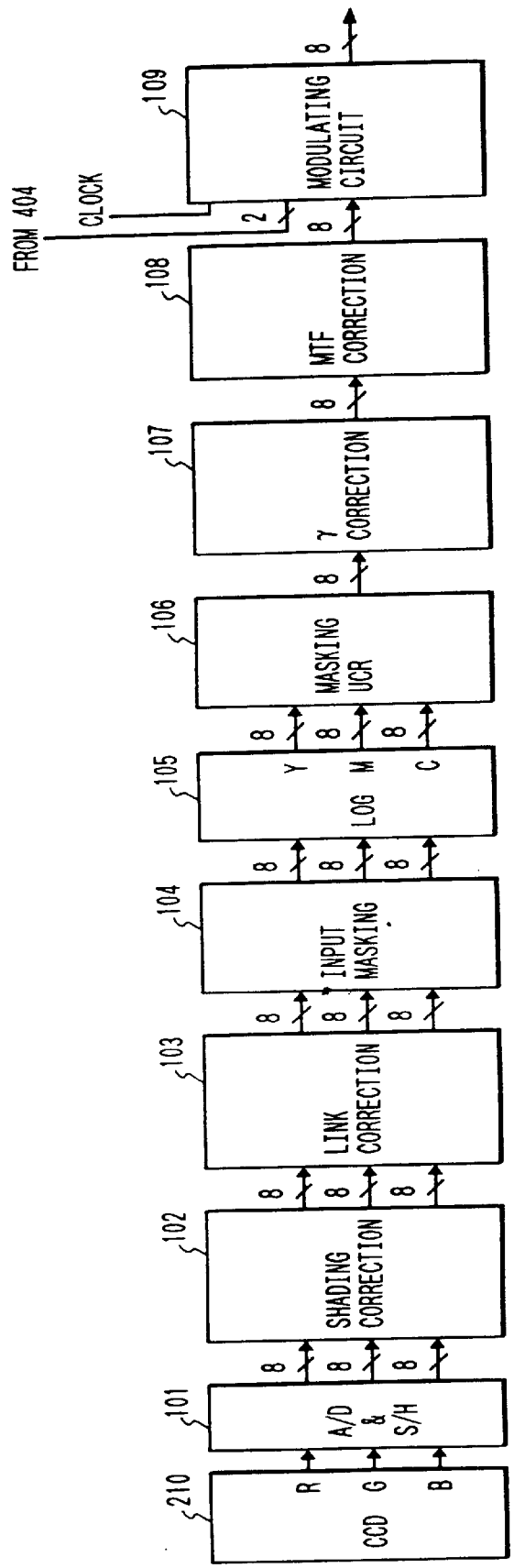
FIG. 1 is a block diagram of an image scanner unit.

FIG. 1 is a block diagram of the signal processing unit 211 shown in FIG. 2. RGB chrominance signals (in the embodiment, each of the RGB chrominance signals consists of eight bits) from the CCD 210 are sampled and A/D converted into digital signals by an S/H & A/D unit 101 (sampling/holding and analog/digital converting unit). After that, the digital signals are subjected to a shading correction (the amount by which the light fluctuates is corrected on the basis of data of a reference white board which is not shown) by a shading correction circuit 102. The shading corrected signals are further subjected to a link correction (the spatial deviation in the arrangement of the CCD sensors is electrically corrected by using delay memories) by a link correction circuit 103. The link corrected signals are converted into color space signals of the NTSC standard by an input masking processing unit 104. The color space signals are LOG (logarithm) converted from the luminance information (RGB signals) into concentration information of Y (yellow), M (magenta) and C (cyan) (hereinafter simply referred to as Y, M, and C signals) by a YMC/LOG conversion circuit 105. Reference numeral 106 denotes a masking (the chrominance signals are corrected in accordance with the characteristics of the toners) and UCR (undercolor removal) circuit for converting the black component in three colors of Y, M and C by a single color Bk (black) toner (hereinafter, simply referred to as a Bk toner). An output signal of the masking UCR circuit 106 is gamma corrected by a γ correction unit 107. Reference numeral 108 denotes an MTF correction circuit to perform an edge emphasis or smoothing operation. Reference numeral 109 denotes a modulating circuit to perform modulation on the basis of a signal from a memory 404 in FIGS. 4A and 4B, which will be explained later herein. The internal construction of the modulating circuit 109 will be explained later herein.

In the printer unit 202, the signal generated from the signal processing unit 211 is demodulated by the printer reception signal processing unit 212. A laser beam emitted from the semiconductor laser 213 scans on the photosensitive drum 217 through the polygon mirror 214, f-θ lens 215, and mirror 216, thereby forming an electrostatic latent image.

The rotary developing device 218 is constructed by the Y, M, C and Bk developing units 219 to 222. One of the developing units is selected from the rotary developing device 218 and is brought into contact with the photosensitive drum 217, thereby developing the electrostatic latent image formed on the photosensitive drum by the toner. On the other hand, paper which is fed out from the sheet cassette 224 or 225 is wrapped and held around the drum 223 and the image developed on the photosensitive drum is transferred onto the paper. The above scanning process and the developing and transferring process are repeated for the four colors Y, M, C and Bk. After the developed images of the four colors are sequentially transferred onto the paper as mentioned above, the paper passes through the fixing unit 226 and the toners of the four colors are fixed onto the paper. After that, the paper is delivered to the outside of the apparatus along the direction shown by arrows in the diagram.

Figure 3:
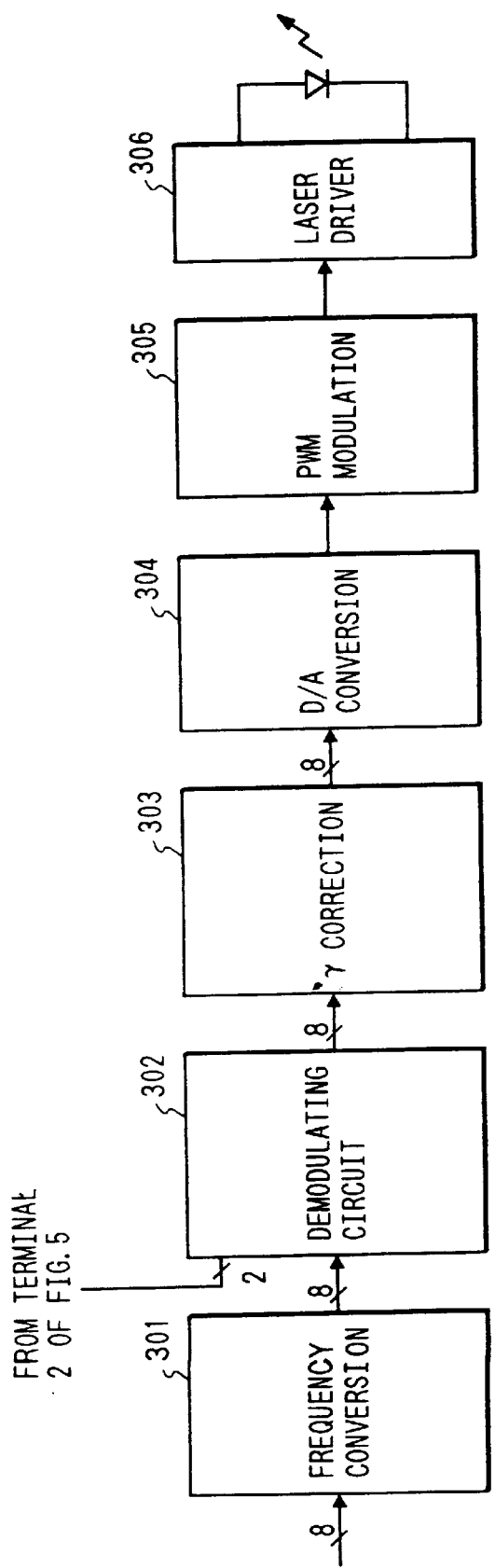
FIG. 3 is a block diagram of a printer unit.

FIG. 3 shows a block diagram of the printer signal processing unit 212. A frequency conversion unit 301 is a section to frequency convert the signal sent from the scanner unit 201 so as to be synchronized with the clock of the printer unit. A FIFO unit is generally used as a frequency conversion unit 301. The signal which has been frequency converted by the frequency conversion unit is demodulated by a demodulating circuit 302 on the basis of encrypting method data received from a terminal 2 in FIG. 5. An internal construction of the demodulating circuit 302 will be explained hereinbelow.

A γ correction unit 303 corrects a change in printer concentration due to an environmental fluctuation. In the preferred embodiment, by applying such a correction, a dot pattern, which can be mechanically read although it cannot be recognized by human eyes, is generated synchronously with the image signal, the dot pattern is modulated in accordance with a code that is peculiar to the copying apparatus main body, the modulated signal is generated, and the dot pattern is synthesized on an object to be copied, thereby adding a forgery preventing function. The signal which is γ corrected by the γ correction unit 303 is subsequently D/A converted into the analog signal by a D/A conversion unit 304. The analog signal is pulse width modulated by a PWM modulation unit 305. After that, the pulse width modulated signal is sent to a laser driver 306, by which the semiconductor laser 213 is driven for each of the Y, M, C and Bk signals.

Figure 4A:
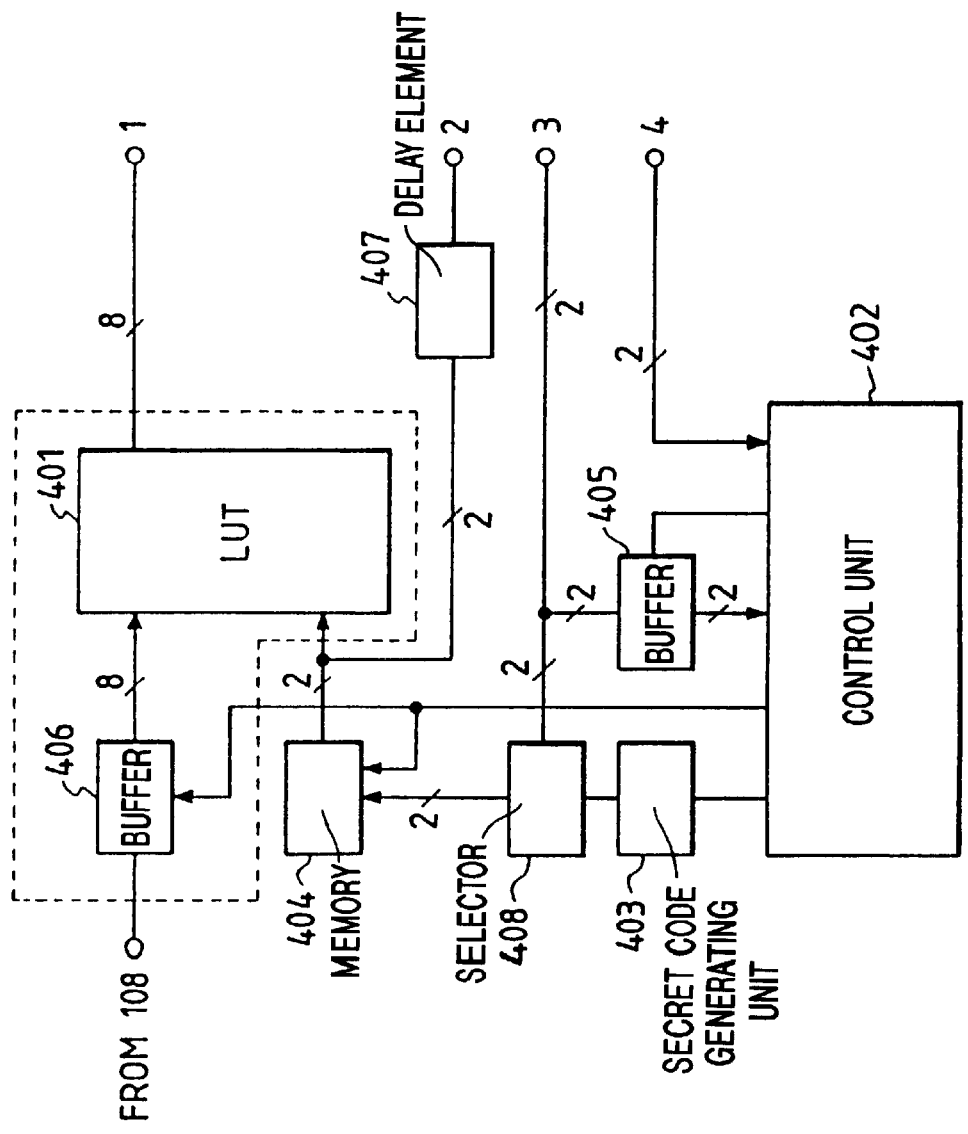
FIGS. 4A and 4B are a schematic block diagram of a modulating circuit section and a schematic diagram of a table of a modulating circuit.
Figure 4B:
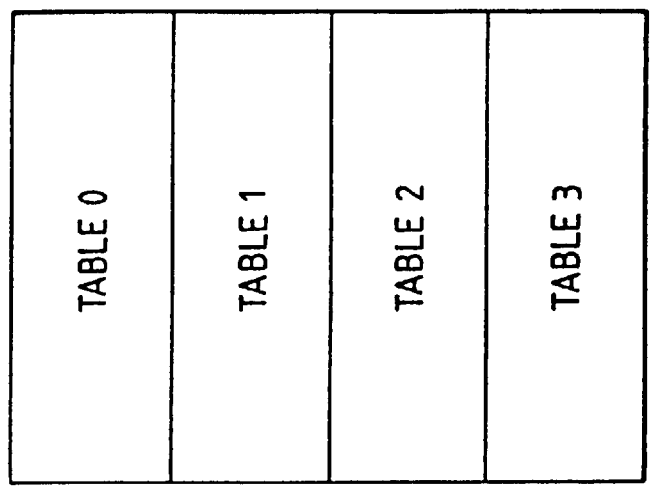

FIG. 4A shows a control unit connected to the modulating circuit 109 by a bus. A portion surrounded by a dotted line corresponds to the modulating circuit 109 in FIG. 1. An LUT (lookup table) 401 comprises a ROM or RAM and functions having a one-to-one corresponding relation are stored in a memory area. In case of the ROM, predetermined functions have been written. In case of the RAM, a function according to the selection of the user is used. Four memory areas exist in accordance with the encrypting method data (which is two bits in the embodiment) as shown in FIG. 4B. One of the four memory areas is allocated to the through mode in which an encrypting process is not executed. Reference numeral 402 denotes a control unit; 403 denotes a secret code generating circuit; 404 denotes the memory; 405 and 406 denote buffers; 407 denotes a delay element; and 408 denotes a selector to decide the generating direction of the signal.

In FIG. 4A, reference numeral 1 denotes a terminal to transmit the modulated image data; 2 denotes a terminal to transmit the encrypting method data to designate the memory area in the LUT 401; 3 denotes a terminal to transmit the coding data; and 4 denotes a terminal to receive the encrypting method data. The terminals 3 and 4 are used to discriminate whether the scanner unit and the printer unit are properly connected or not by comparing the transmission data and the reception data.

The operation of the modulating circuit will now be described hereinbelow with reference to FIG. 4A. A selection start signal is sent from the control unit 402 to the secret code generating circuit 403. In accordance with this signal, the encrypting method data of two bits is selected by a random number generating method or the like at a timing which will be explained later herein. The selected data is sent to the buffer 405 and the demodulating circuit by a selector 408. The data which is transmitted via the terminal 4 from the demodulating circuit is compared with the original data stored in the buffer 405. When they are equal, the encrypting method data is sent to the memory 404 through the selector 408 and clocks are supplied to the memory 404 and buffer 406, so that the encrypting method data and the image signal are supplied to the LUT 401. When those data are not equal, the image data is not supplied so as not to execute the copying operation as will be explained hereinbelow. In the LUT 401, a table according to each memory area is selected by the encrypting method data from the memory 404 and is allowed to act on the image signal from the buffer 406, thereby allowing the modulation signal to be generated and transmitted to the demodulating circuit. The delay element 407 delays the transmission of the encrypting method data by only an amount of time which is required to modulate the image signal by the LUT 401.

Figure 5:
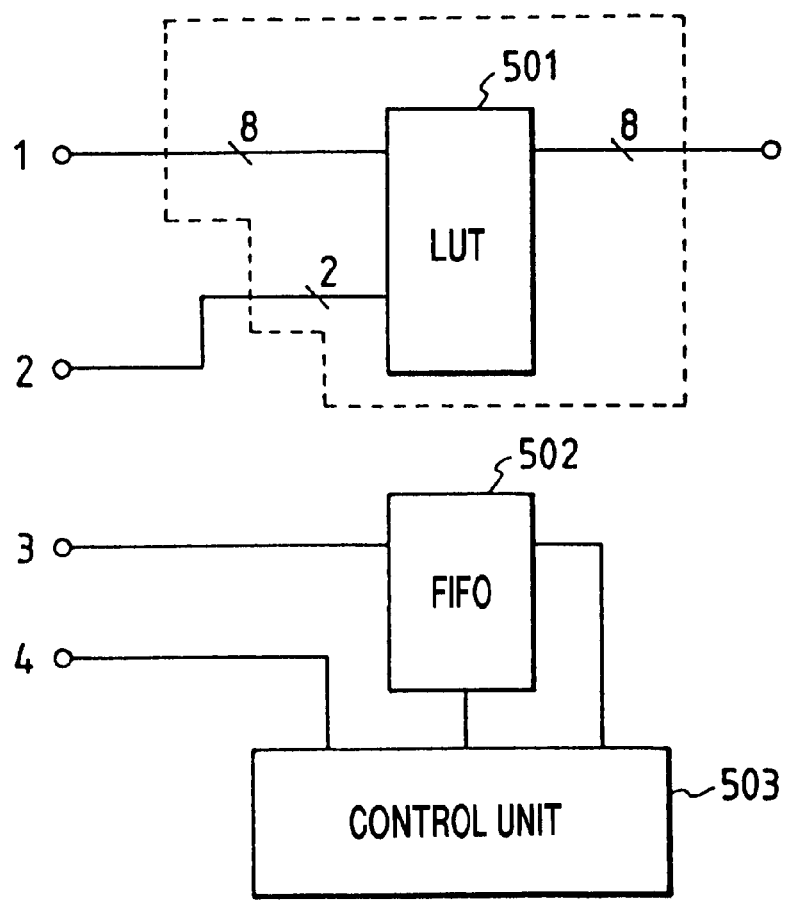
FIG. 5 is a schematic block diagram of a demodulating circuit section.

FIG. 5 shows a control unit connected to the demodulating circuit 302 by a bus. A portion surrounded by a dotted line corresponds to the inside of the demodulating circuit shown in FIG. 3. A LUT 501 is also constructed by a ROM or RAM in a manner similar to the LUT 401 shown in FIGS. 4A and 4B. Reference numeral 502 denotes a FIFO unit and 503 indicates a control unit.

The operation of the demodulating circuit will now be described hereinbelow with reference to FIG. 5.

The encrypting method data which is sent from the control unit on the scanner side is accumulated in the FIFO unit 502. In accordance with a clock signal from the control unit 503, the encrypting method data is transmitted from the FIFO unit 502 to the control unit on the scanner side through the control unit 503. When the control unit on the scanner side determines that the encrypting method data from the control unit on the printer side is proper, the modulation data is transmitted to the LUT 501 and the encrypting method data is simultaneously transmitted from the control unit of the modulating circuit. In the LUT 501, the function in the memory area which is determined by the encrypting method data is allowed to act on the modulation signal, thereby demodulating the signal. The function in the memory area of the LUT 501 corresponding to the encrypting method data is an inverse function of the function of the memory area according to the data in the LUT 401.

FIG. 6 shows a panel for the through mode in which the encrypting method process is not executed. An example of the through mode will now be described hereinbelow with reference to FIG. 6. S601 in FIG. 6 denotes a standard image plane when the copying operation is accepted. When a predetermined key in the operation unit (not shown) is operated, the screen is switched to an image plane in the through mode as shown in S602. The through mode is useful when a check is made to see if an abnormal portion exists in the modulating and demodulating circuits in the case where an abnormal image is generated. Tables for the through mode corresponding to the encrypting method data have been allocated to predetermined memory areas in the LUT 401 in FIGS. 4A and 4B and LUT 501 in FIG. 5.

Figure 7:
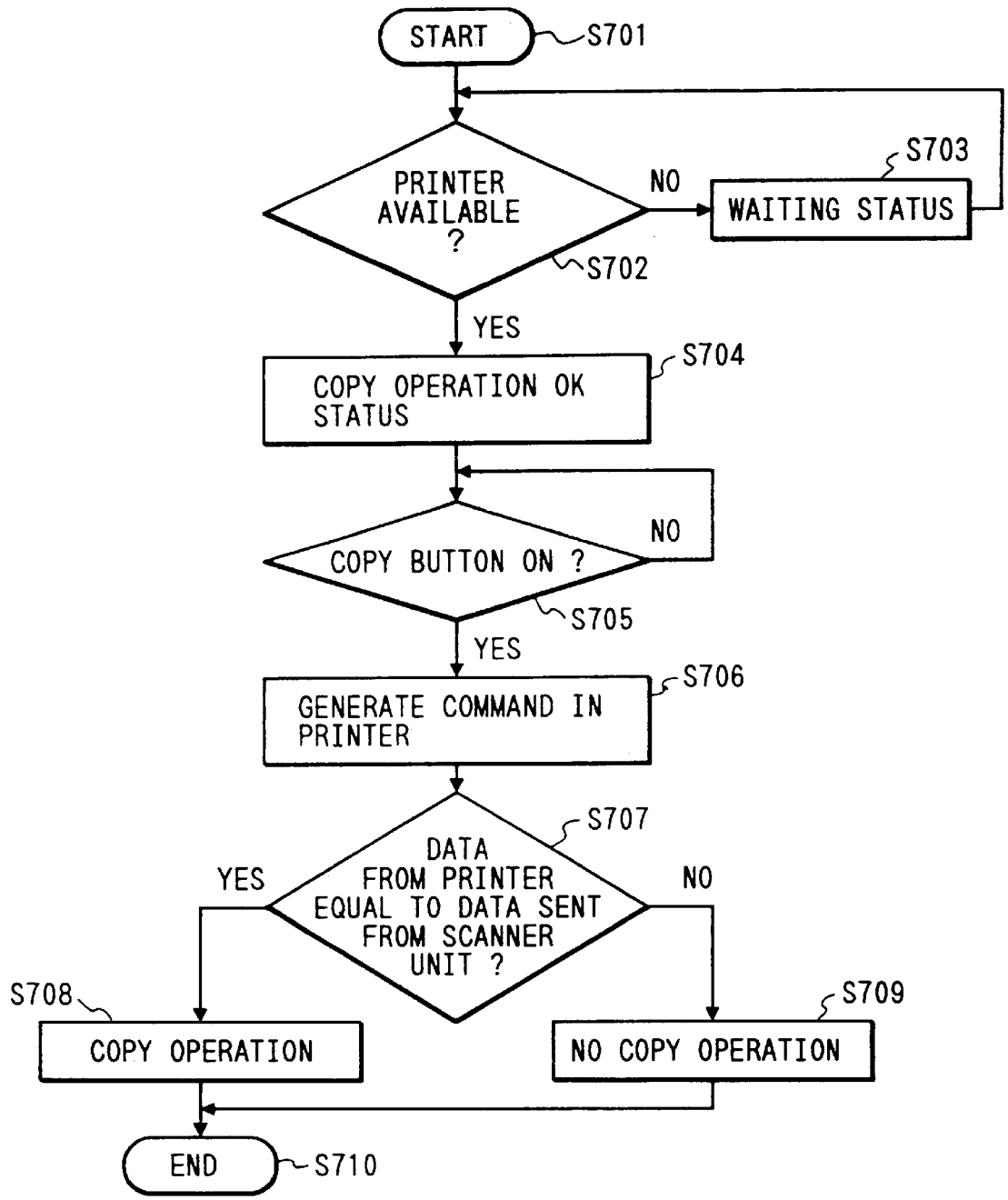

The timing to transmit the encrypting method data between the scanner unit and the printer unit will now be described with reference to FIGS. 7 to 9. First, a flowchart of FIG. 7 is shown as an example in which the encrypting method data is transmitted when a copy button is depressed. In the flowchart of FIG. 7, when the power supply of the apparatus is turned on, a waiting status is displayed until the printer unit can be used (S702, S703). When the printer unit can be used, a copy operation OK status is displayed (S704). The apparatus waits until the copy button is subsequently depressed. When the copy button is depressed (S705), a command (command data to designate that (the encrypting method data)+(transmission data) is the encrypting method data) is generated from the image scanner unit to the printer unit through the terminal 3 in FIG. 4A (S706).

The encrypting method data is transmitted to the modulating circuit in a mode other than the through mode so long as it is not designated by the operation unit.

The scanner unit receives the data from the printer in response to the command (S707). When the data which is transmitted from the scanner unit and the data which is received are equal, the copying operation is executed (S708). When they are different, the copying operation is not executed (S709).

Figure 8:
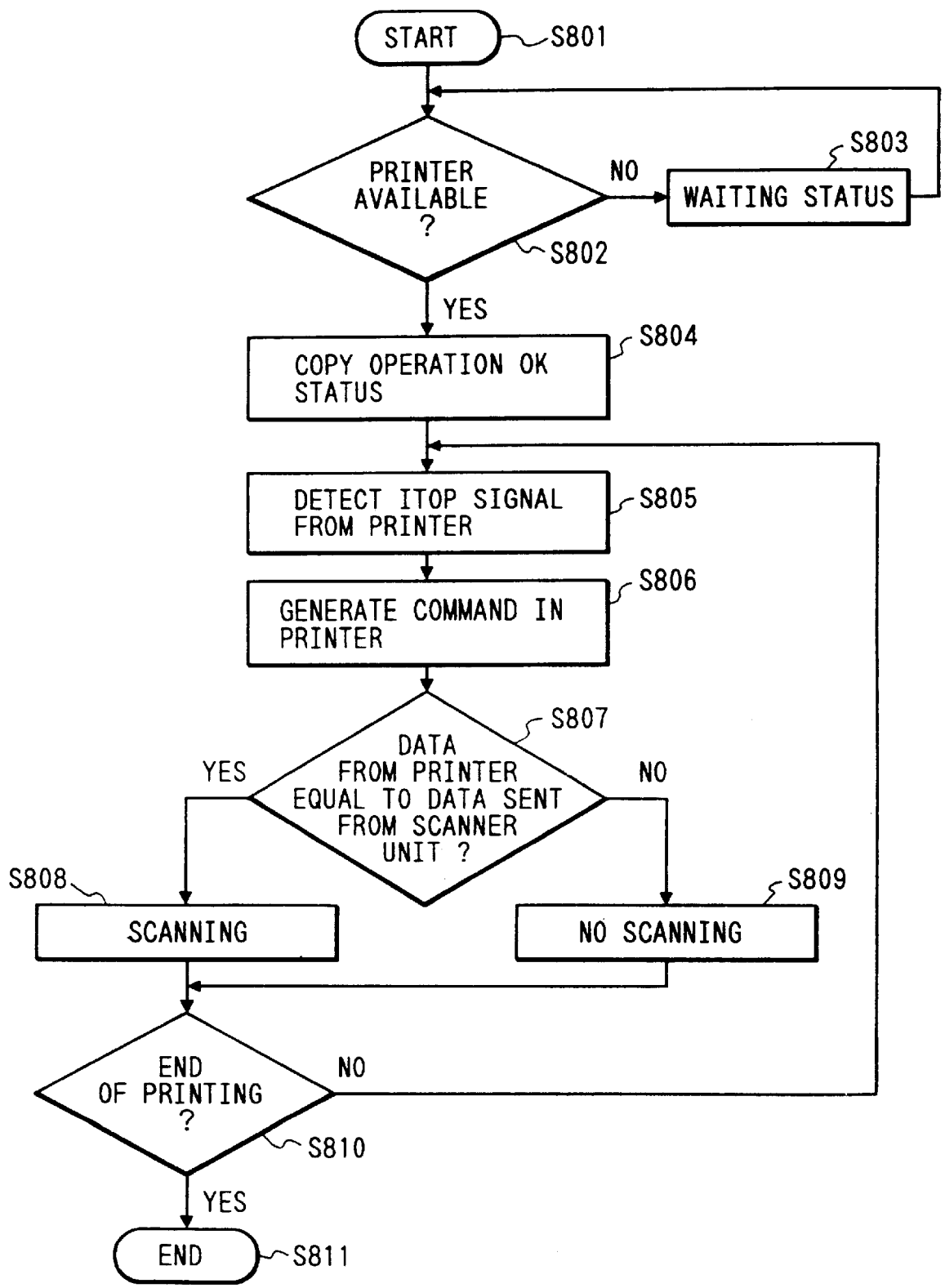
FIG. 8 is a flowchart of a method of communicating between the image scanner unit and the printer unit for every scan.

FIG. 8 is a flowchart of a method of transmitting the encrypting method data each time the scanner unit scans. In FIG. 8, the waiting status is displayed until the printer unit can be used after the power source of the apparatus was turned on (S802, S803). When the printer unit can be used, the copy operation OK status is displayed (S804).

When the copying operation is started and the paper is conveyed and a paper edge signal (ITOP signal) is detected by the scanner (S805), a command (command data to designate that (the encrypting method data)+(transmission data) is the encrypting method data) is generated from the scanner to the printer (S806).

A mode other than the through mode is also selected for the encrypting method data here. The scanner receives the data from the printer for the transmission data (S807). When the transmission data from the scanner and the reception data are equal, the scanning operation is continuously executed (S808). When they are different, the scanning operation is stopped (S809).

According to the embodiment in which the command is sent for every scan, the image is excellent in the case where it is transmitted to not only the printer but also an external apparatus, for example, an image memory.

Figure 9:
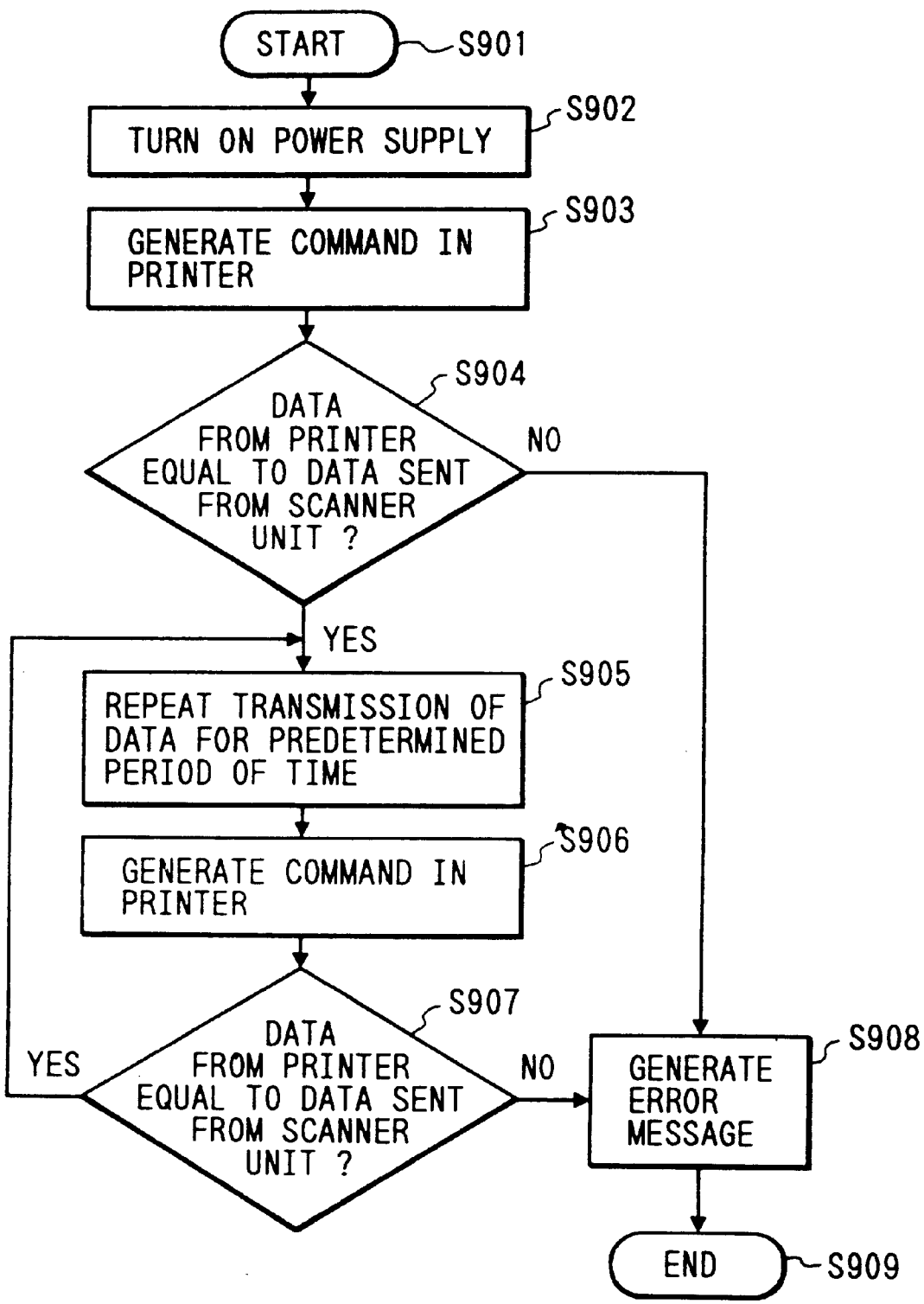
FIG. 9 is a flowchart of a method for communicating between the image scanner unit and the printer unit when a power supply is turned on and at every predetermined time.

FIG. 9 is a flowchart of a method of transmitting a command when the power supply of the apparatus is turned on and after the elapse of every predetermined time from the power-on operation. First, in a power-on state (S902), the command (command data to designate that (the encrypting method data)+(transmission data) is the encrypting method data) is generated from the scanner to the printer (S903). The scanner receives the data from the printer unit in response to the command (S904). When the received data is the same as the transmitted signal, the data is repetitively transmitted to the printer unit every time (S905 to S907). The above operations are repeated when the transmission data and the reception data are different in the scanner unit or until the printing operation is finished (S908).

In the present embodiment, the memory area designation data in the LUT in FIGS. 4A, 4B or 5 have been used as the encrypting method data. However, the encrypting method data is not limited to such data but any other signal can be used so long as it is a signal to demodulate the modulation data.

Figure 10:
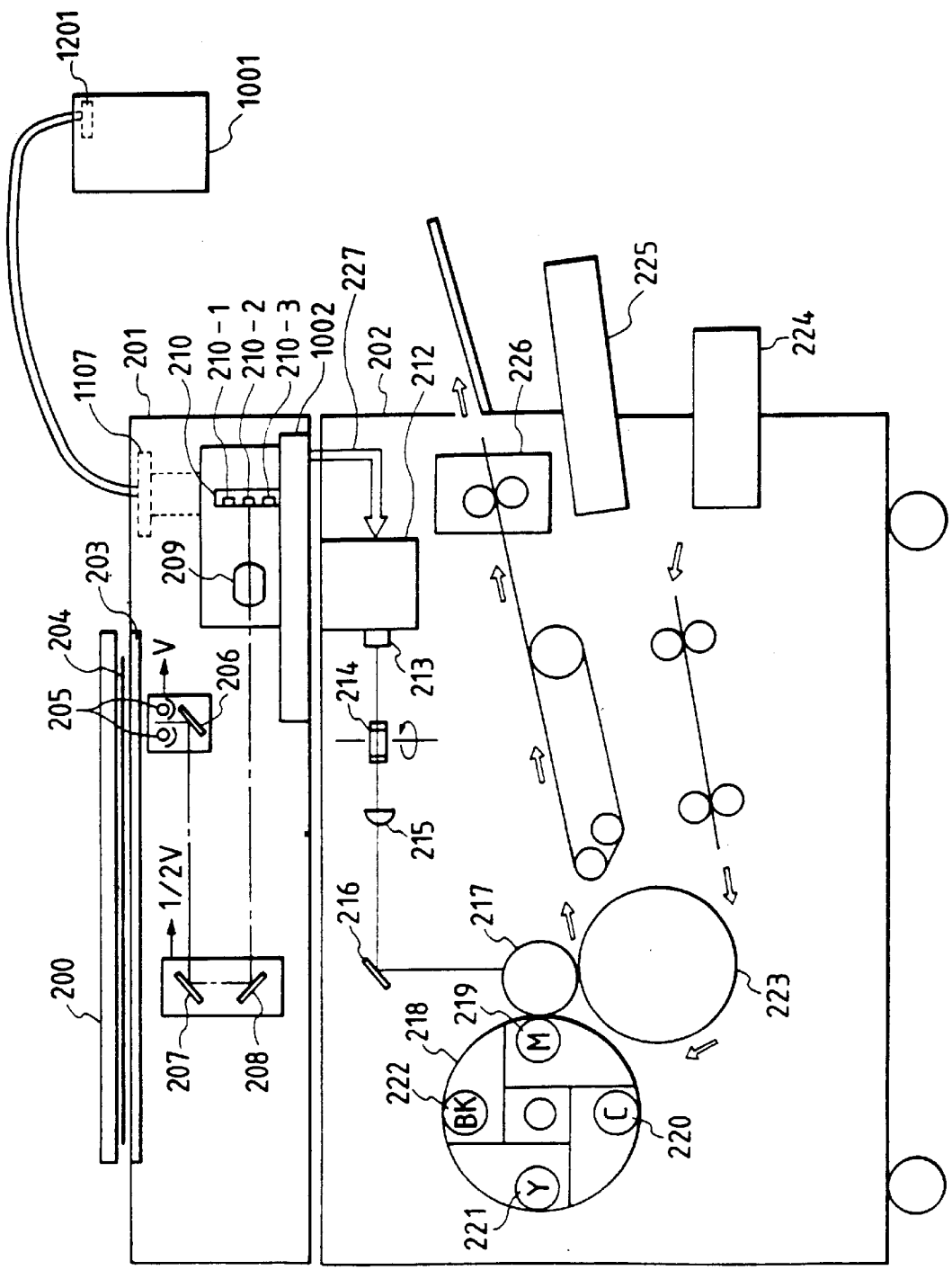
FIG. 10 is a cross sectional view of the apparatus when an image memory device is connected to the image scanner unit shown in FIG. 1.

FIG. 10 is a schematic diagram of an image processing apparatus of another embodiment of the invention.

The component elements 201 to 226 are substantially the same as those shown in FIG. 2 and their descriptions, accordingly, are omitted here.

Reference numeral 227 denotes a reader printer interface; 1001 denotes an image memory device; 1002 denotes a signal processing unit; 1107 denotes an external interface of the image scanner unit; and 1201 denotes an external interface of the image memory device. As signals which are used in the external interface, in addition to R, G and B signals and C, M, Y and Bk signals as image signals, which will be explained later herein, there are a clock signal of the scanner 201 and the image memory device 1001, main scan image start position signal, a main scan sync signal, and a subscan sync signal.

Figure 11:
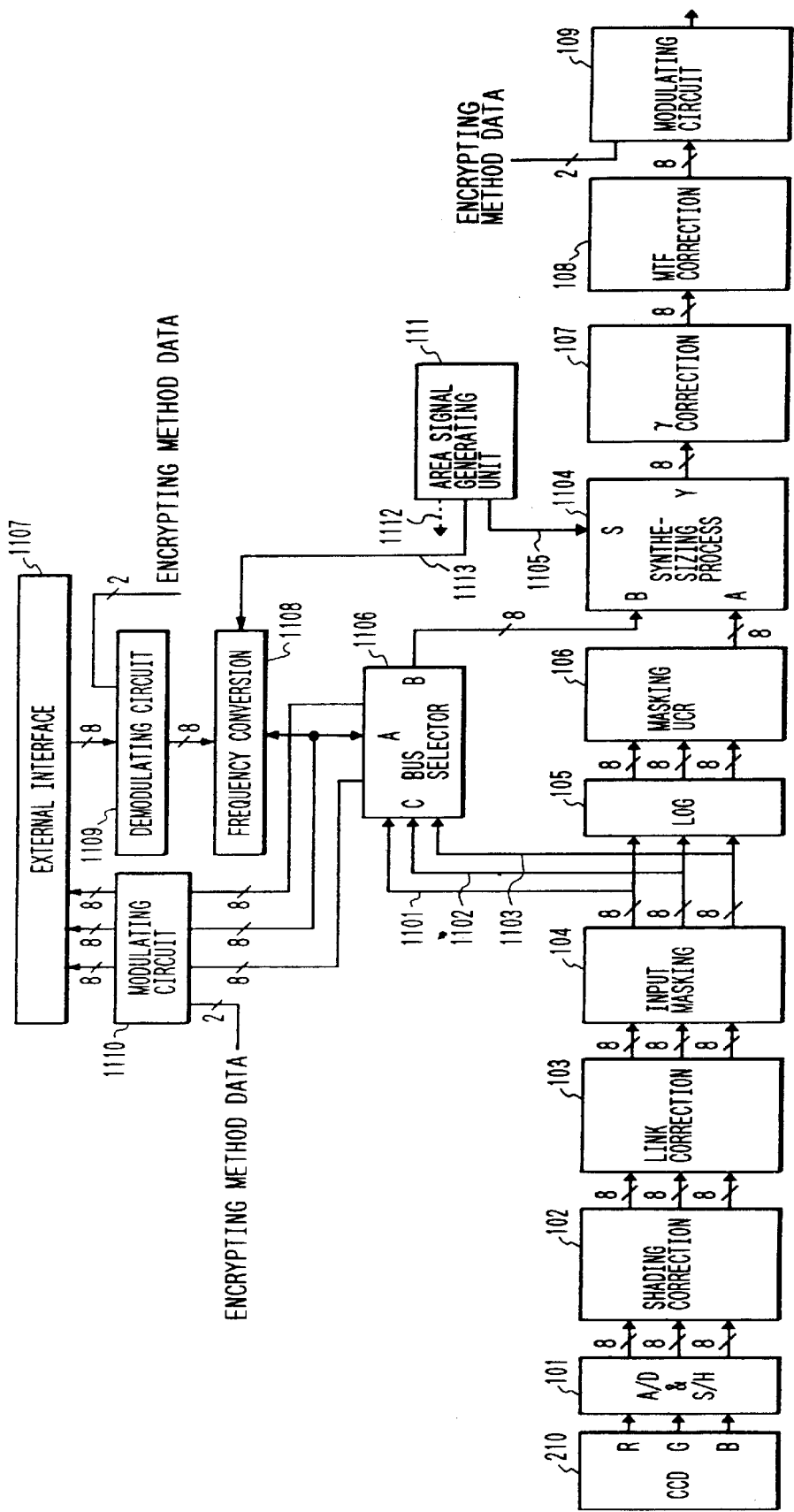
FIG. 11 is a block diagram of an image scanner unit.

FIG. 11 shows a block diagram of the image scanner unit.

Since the component elements 101 to 109 and 210 are similar to those shown in FIG. 1, their descriptions are omitted here.

Reference numerals 1101 to 1103 denote a signal lines of the RGB signals; 1104 denotes a synthesizing processing unit; 1105 denotes a signal line from the area signal generating unit to the synthesizing processing unit; 1106 denotes a bus selector; 1107 denotes the external interface of the image scanner unit; 1108 denotes a frequency conversion unit; 1109 denotes a demodulating circuit; 1110 denotes a modulating circuit; 1111 denotes an area signal generating unit; 1112 denotes a signal line of a main scan start position signal to designate a memory area in the image memory device; and 1113 denotes a signal line of the main scan start position signal to designate an image synthesizing area.

The operation from the input of the image data to the external interface 1107 will now be described hereinbelow with reference to FIG. 11.

The signals read by the CCD sensor 210 are sampled and held and A/D converted into the digital signals by the S/H & A/D unit 101. After that, the digital signals are generated as RGB signals each consisting of eight bits in the embodiment. The digital RGB signals are subjected to a shading correction by the shading correction circuit 102 in a manner similar to the above, a link correction by the link correction circuit 103, and an input masking process by the input masking circuit 104, respectively.

The RGB signals pass through the signal lines 1101 to 1103 and are supplied to a C portion of the bus selector 1106 and are output from an A portion.

The bus selector 1106 sets a register in the bus selector into the input C→ output A mode by a CPU (not shown).

In a manner similar to FIGS. 4A and 4B, the RGB signals are modulated by the modulating circuit 1110 and are generated through the external interface 1107. In this case, the modulating circuits 1110 and 109 are substantially differently constructed and independently execute the modulation.

Figure 12:
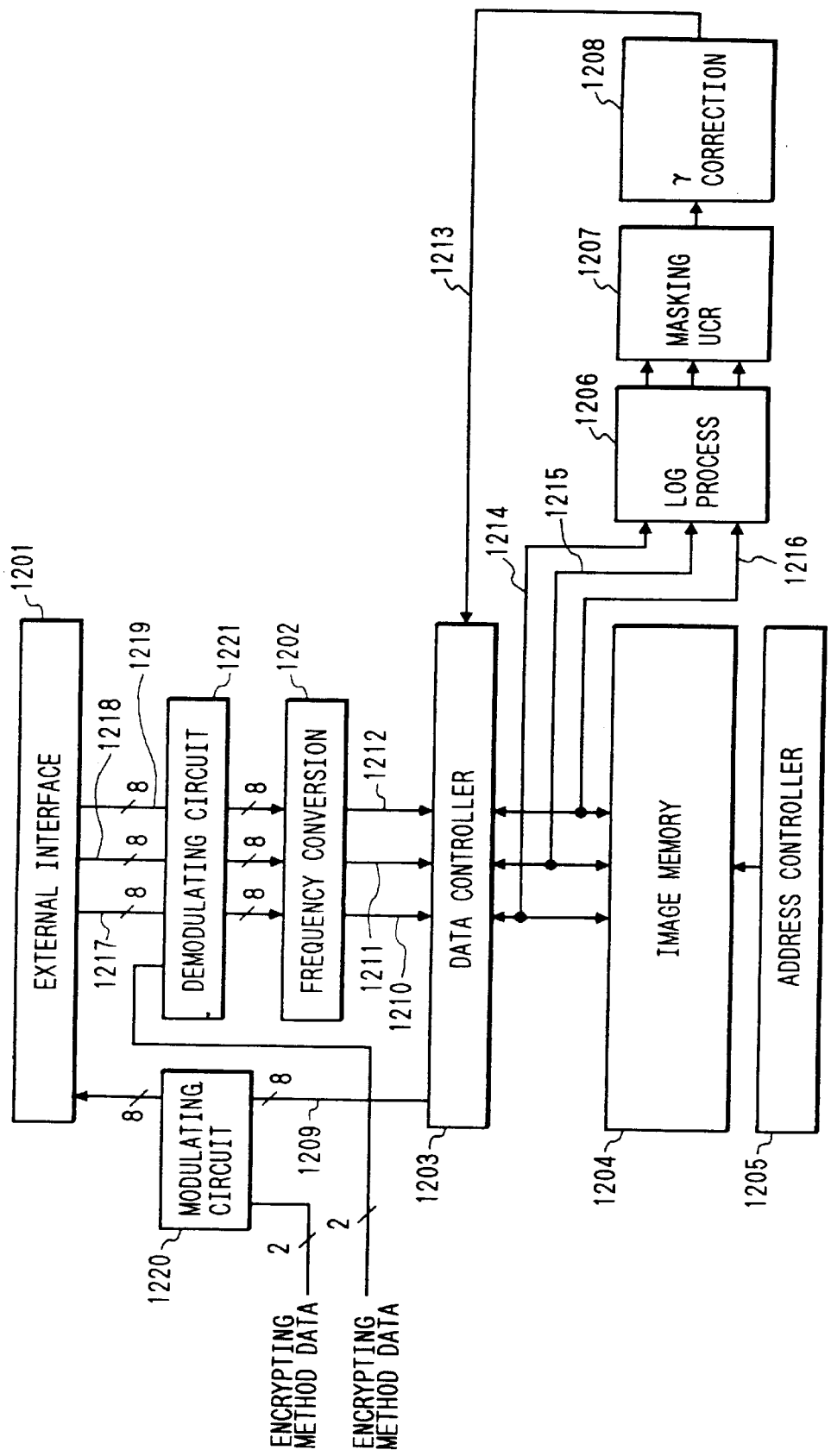
FIG. 12 is a block diagram of the image memory device.

FIG. 12 is a block diagram showing the operation of the image memory device 1001.

Reference numeral 1201 denotes the external interface of the image memory device; 1202 denotes a frequency conversion unit for synchronizing the RGB signals from the image scanner unit with the clocks of the image memory device; 1203 denotes a data controller to determine the generating direction of the signal; 1204 denotes an image memory to store the image data; 1205 denotes an address controller to designate an address in the image memory; and 1206 to 1208 denote a LOG conversion unit, a masking UCR unit, and a γ correction unit for executing processes similar to those in the units 105 to 107 shown in FIG. 1. The descriptions of the units 1206 to 1208 are, therefore, omitted here.

Reference numeral 1209 denotes a signal line to transmit the Y, M, C and Bk signals which are generated each time in the masking process.

Reference numerals 1210 to 1212 denote signal lines of the RGB signals which are generated from the frequency conversion unit 1202. Reference numeral 1213 denotes a signal line to transmit the signals which were γ corrected by the γ correction unit 1208.

Reference numerals 1214 to 1216 denote signal lines to transmit the RGB signals to the LOG conversion unit 1206; 1217 to 1219 denote signal lines to transmit the RGB signals from the external interface to a demodulating circuit 1221; and 1220 denotes a modulating circuit similar to that shown in FIGS. 4A and 4B.

The writing operation into the image memory device will now be described hereinbelow with reference to FIG. 12.

The modulated RGB signals which are transmitted from the external interface 1201 of the image memory unit pass through the signal lines 1217 to 1219 and are demodulated by the demodulating circuit 1221 comprising three demodulating circuits each having the same structure as that shown in FIG. 5 for the three RGB signals.

The demodulated RGB signals are synchronized with the clocks in the image memory device 1001 by the frequency conversion unit 1202. The RGB signals subsequently pass through the data controller 1203 and are written into the memory area in the image memory 1204 which is determined by the addresses which are decided by the address controller 1205.

An image synthesis of the image signal stored in the image memory device 1101 and the image signal from the image scanner unit 201 will now be described. A method of the image formation will now be described hereinbelow.

A main scan sync signal and a subscan sync signal are produced by the printer unit 202 in FIG. 2 and pass through the reader printer interface 227 and the external interface 1107 of the image scanner unit and are supplied to the external interface 1201 in FIG. 12 of the image memory device. The RGB data is read out from the image memory 1204 on the basis of the main scan sync signal and the subscan sync signal in accordance with the addresses which are decided by the address controller 1205. The read-out RGB data passes through the signal lines 1214 to 1216 and is converted into the concentration information by the LOG conversion unit 1206 and is subjected to the color correcting and undercolor removing processes by the masking UCR unit 1207. The processed signal from the masking UCR unit is γ corrected by the γ correction unit 1208. The γ corrected signal is sent to the modulating circuit 1220 by the data controller 1203 and is output from the external interface 1201 of the image memory device set in the output unit.

Since four colors of Y, M, C and Bk are needed to form a synthesized image, the above operations are executed four times with respect to four colors of Y, M, C and Bk, respectively.

In this manner, the area-sequential Y, M, C and Bk signals are transmitted to the external interface 1107 of the image scanner unit.

In the image scanner unit, each signal is first demodulated by the demodulating circuit 1109 to execute a process similar to that shown in FIG. 5 and the main scan sync signal of the image scanner unit and the image clocks are synchronized by the frequency conversion unit 1108.

In the bus selector 1106, by setting the input to assume A and the output to assume B into the register in the bus selector by the CPU (not shown), each signal is sent from the input A to the output B.

In the synthesizing processing unit 1104, the signal generated from the area signal generating unit 1111 is received through the signal line 1105 and on the basis of its value, whether the original image signal which is supplied to the input A is selected or the signal which is transmitted from the memory area and is supplied to the output B is selected is determined and selected signal is generated from Y.

The synthesized image signal formed in this manner is generated from the printer unit.

In the embodiment, the area signal generating unit generates the A signal when the area signal S=0 and generates the Bi signal when S=1.

Figure 13:
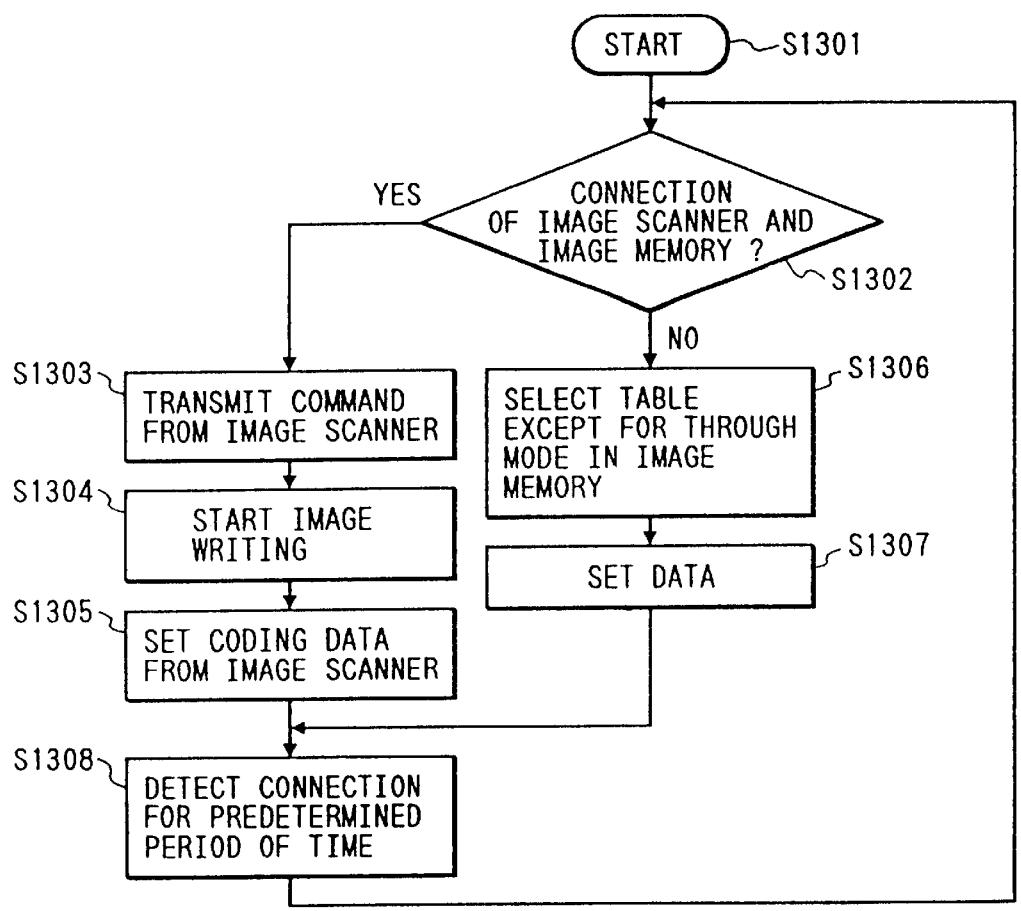
FIG. 13 is a flowchart showing a method for inhibiting the through mode when the image scanner unit and the image memory device unit are not connected.

There is a case where, when another interface other than the legal interface is connected from the outside after the image scanner unit or the LUT of the modulating circuit in the image memory was set into the through mode, the apparatus can be illegally used. A method to prevent such a problem will now be described hereinbelow with reference to a flowchart of FIG. 13.

First, when the image scanner unit is connected to the image memory unit, the command from the image scanner is transmitted as usual, and when the image writing operation is started, the encrypting method data from the image scanner unit is set, and the ordinary encrypting operation is executed (S1301 to S1305). On the other hand, when the image scanner unit and the image memory device are not connected, the control unit 402 shown in FIG. 4A detects that they are not connected, and the secret code generating circuit 403 selects the encrypting method data in a mode other than the though mode, and a table in the mode other than the through mode is set from the tables shown in FIG. 4B (S1301 to S1302, S1306 to S1307).

In case of another image processing apparatus, when they are not connected, processes are likewise executed so as not to enter the through mode as mentioned above.

The connecting state between the image scanner and the image memory device is detected at a predetermined interval by the following two signal lines: a signal line when the image scanner sees the connection of the image memory device; and a signal line when the image memory device sees the connection of the image scanner (S1308).

Even when the LUT 401 is set into the through mode after completion of the communication with the receiving apparatus using the encrypting method data before the image data is encrypted, the control unit detects the connecting state between them and switches the LUT 401 into the table in a mode other than the through mode, so that the improper use can be prevented.

The invention is not limited to only the color copying apparatus and the image memory device but can be also applied to every case such that a signal is transmitted and received between image processing apparatuses such as image reading apparatus like a scanner or camera, an image memory device like a disk such as a photo CD, a tape, or a semiconductor memory, and an image forming display apparatus like a printer plus display.

What is claimed is:

1. An image forming apparatus comprising:
   demodulating means for demodulating a modulated image signal to form a demodulated image signal;
   synthesizing means for synthesizing the demodulated image signal with a signal of an input image to form a synthesized image; and
   modulating processing means for subjecting the synthesized image to a modulating processing to form a modulated synthesized image.

2. An apparatus according to claim 1, further comprising area generating means for defining a synthesizing area in which synthesizing is effected by said synthesizing means.

3. An apparatus according to claim 1, wherein the demodulated image signal and the input image signal are color image signals, and said synthesizing means comprises means for effecting synthesis of the demodulated image signal with the input image signal for each color component constituting the color image signals.

4. An apparatus according to claim 1, further comprising adding means for adding information which is not recognizable to human eyes to the modulated synthesized image.

5. An apparatus according to claim 4, further comprising image forming means for effecting image formation in accordance with the modulated synthesized image, wherein said adding means effects the addition of the information which is not recognizable to human eyes prior to image formation by said image forming means.

6. An apparatus according to claim 1, further comprising means for inputting the input image from a scanner.

7. An apparatus according to claim 1, further comprising means for inputting the input image from a camera.

8. An apparatus according to claim 1, further comprising means for inputting the input image from a disc.

9. An image forming method comprising the steps of:
   demodulating a modulated image signal to form a demodulated image signal;
   synthesizing the demodulated image signal with a signal of an input image to form a synthesized image; and
   subjecting the synthesized image to a modulating processing to form a modulated synthesized image.

10. A method according to claim 9, further comprising an area generating step for defining a synthesizing area in which synthesizing is effected in said synthesizing step.

11. A method according to claim 9, wherein the demodulated image signal and the input image signal are color image signals, and the synthesis of the image signal with the input image signal is effected for each color component constituting the color image signals.

12. A method according to claim 9, further comprising an adding step for adding information which is not recognizable to human eyes to the modulated synthesized image.

13. A method according to claim 12, further comprising an image forming step for effecting image formation in accordance with the modulated synthesized image, wherein said adding step effects the addition of the information which is not recognizable to human eyes prior to image formation by said image forming step.

14. A method according to claim 9, wherein the input image is input by a scanner.

15. A method according to claim 9, wherein the input image is input by a camera.

16. A method according to claim 9, wherein the input image is input from a disc.

17. An image forming apparatus comprising:
   demodulating means for demodulating a modulated image signal to form a demodulated image signal;
   synthesizing means for synthesizing the demodulated image signal with a predetermined signal to form a synthesized image; and
   modulating processing means for subjecting the synthesized image to a modulating processing to form a modulated synthesized image.

18. An apparatus according to claim 17, further comprising area generating means for defining a synthesizing area in which synthesizing is effected by said synthesizing means.

19. An apparatus according to claim 17, wherein the demodulated image signal and the predetermined signal are color signals, and said synthesizing means comprises means for effecting synthesis of the demodulated image signal with the predetermined signal for each color component constituting the color image signals.

20. An apparatus according to claim 17, further comprising adding means for adding information which is not recognizable to human eyes to the modulated synthesized image.

21. An apparatus according to claim 17, further comprising image forming means for effecting image formation in accordance with the modulated synthesized image, wherein said adding means effects the addition of the information which is not recognizable to human eyes prior to image formation by said image forming means.

22. An apparatus according to claim 17, further comprising means for inputting the input image from a scanner.

23. An apparatus according to claim 17, further comprising means for inputting the input image from a camera.

24. An apparatus according to claim 17, further comprising means for inputting the input image from a disc.

25. An image processing apparatus comprising:
   demodulating means for demodulating a modulated image signal to form a demodulated image signal;
   generating means for processing the image signal demodulated by said demodulating means to generate an after-processing image different from an after-demodulating image; and
   modulating processing means for subjecting the after-processing image obtained by said generating means to a modulating processing to form a modulated after-processing image.

26. An apparatus according to claim 25, further comprising signal generating means for generating an area signal for defining a processing area in which said processing is effected.

27. An apparatus according to claim 25, comprising adding means for adding information which is not recognizable to human eyes to the modulated image by said modulating processing means.

28. An apparatus according to claim 27, comprising image forming means for effecting image formation in accordance with the modulated image by said modulating processing means, wherein said adding effects the addition of the information which is not recognizable to human eyes prior to image formation by said image forming means.

29. An information forming method comprising the steps of:
   demodulating a modulated image signal to form a demodulated image signal;
   synthesizing the demodulated image signal with a predetermined signal to form a synthesized image; and
   subjecting the synthesized image to a modulating processing to form a modulated synthesized image.

30. An image processing method comprising the steps of:
   demodulating a modulated image signal to form a demodulated image signal;
   processing the image signal demodulated in said demodulating step to generate an after-processing image different from an after-demodulating image; and
   subjecting the after-processing image obtained in said processing step to a modulating processing to form a modulated after-processing image.

* * * * *

UNITED STATES PATENT AND TRADEMARK OFFICE
CERTIFICATE OF CORRECTION

PATENT NO. : 6,055,313

DATED : April 25, 2000

INVENTOR(S): MITSURU KURITA, ET AL.

It is certified that error appears in the above-identified patent and that said Letters Patent is hereby corrected as shown below:

On the Title Page:
ABSTRACT [57]
    Line 1, "can" should read --which can--.

COLUMN 5
    Line 8, "A" should read --An--.

COLUMN 7
    Line 1, "a" should be deleted.

COLUMN 8
    Line 64, "Bi" should read --B--.

Signed and Sealed this

Third Day of April, 2001

*Attest:*

NICHOLAS P. GODICI

*Attesting Officer*     Acting Director of the United States Patent and Trademark Office